(12) United States Patent
Nishino et al.

(10) Patent No.: US 11,899,573 B2
(45) Date of Patent: Feb. 13, 2024

(54) MEMORY SYSTEM

(71) Applicant: Kioxia Corporation, Tokyo (JP)

(72) Inventors: Reina Nishino, Kanagawa (JP);
Tetsuya Sunata, Kanagawa (JP);
Takumi Fujimori, Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 55 days.

(21) Appl. No.: 17/684,576

(22) Filed: Mar. 2, 2022

(65) Prior Publication Data

US 2023/0089083 A1 Mar. 23, 2023

(30) Foreign Application Priority Data

Sep. 21, 2021 (JP) ................. 2021-152897

(51) Int. Cl.
*G06F 12/00* (2006.01)
*G06F 12/02* (2006.01)
*G06F 3/06* (2006.01)

(52) U.S. Cl.
CPC ........ *G06F 12/0246* (2013.01); *G06F 3/0619* (2013.01); *G06F 3/0659* (2013.01); *G06F 3/0679* (2013.01); *G06F 12/0253* (2013.01)

(58) Field of Classification Search
CPC .. G06F 12/0246; G06F 3/0619; G06F 3/0659; G06F 3/0679; G06F 12/0253; G06F 3/0608; G06F 3/064; Y02D 10/00
USPC .......................................................... 711/154
See application file for complete search history.

(56) References Cited

U.S. PATENT DOCUMENTS

| | | | | |
|---|---|---|---|---|
| 10,620,958 B1* | 4/2020 | Cheng | ................. | G06F 15/8007 |
| 10,963,160 B2 | 3/2021 | Lee | | |
| 2009/0271562 A1* | 10/2009 | Sinclair | ............... | G06F 12/0246 |
| | | | | 711/E12.008 |
| 2012/0311235 A1 | 12/2012 | Masuo et al. | | |
| 2015/0212937 A1 | 7/2015 | Stephens | | |
| 2016/0011971 A1 | 1/2016 | Lee et al. | | |

FOREIGN PATENT DOCUMENTS

| | | |
|---|---|---|
| JP | 2012-248109 A | 12/2012 |
| JP | 2013-030081 A | 2/2013 |
| TW | 1679534 B * | 12/2019 |

* cited by examiner

*Primary Examiner* — Mardochee Chery
(74) *Attorney, Agent, or Firm* — Foley & Lardner LLP

(57) ABSTRACT

A memory system includes a memory and a controller. The memory is configured to store a number of valid data in each of a plurality of logical blocks and a number of valid data for each of a plurality of banks in each of the logical blocks. The controller is configured to: select logical blocks of garbage collection target candidates based on the numbers of valid data in the logical blocks; calculate a maximum value among the numbers of valid data for the banks in each of the logical blocks of the garbage collection target candidates as a respective comparison value; and select one of the logical blocks of the garbage collection targets based on comparing the respective comparison values of the logical blocks of the garbage collection target candidates with each other.

11 Claims, 10 Drawing Sheets

| LOGICAL BLOCK | NUMBER OF VALID DATA [page] |
|---|---|
| A | 100 |
| B | 150 |
| C | 200 |

| LOGICAL BLOCK | NUMBER OF VALID DATA [page] | | | |
|---|---|---|---|---|
| | Bank0 | Bank1 | Bank2 | Bank3 |
| A | 2 | 0 | 15 | 2 |
| B | 6 | 4 | 5 | 4 |
| C | 5 | 8 | 4 | 3 |
| D | 5 | 7 | 5 | 6 |

FIG. 8A

| LOGICAL BLOCK | NUMBER OF VALID DATA [page] | | | |
|---|---|---|---|---|
| | Bank0 | Bank1 | Bank2 | Bank3 |
| A | 2 | 0 | 15 | 2 |
| B | 5 | 8 | 4 | 3 |
| C | 6 | 4 | 5 | 4 |
| D | 5 | 7 | 5 | 6 |

FIG. 8B

SELECTION IN PROGRESS

| | | | | |
|---|---|---|---|---|
| LOGICAL BLOCK A | 2 | 1 | 4 | 3 |
| LOGICAL BLOCK B | 2 | 5 | 1 | 3 |

| 4 | 6 | 5 | 6 |
|---|---|---|---|

| LOGICAL BLOCK | NUMBER OF VALID DATA IN LOGICAL BLOCK | SECOND READ GUIDE INFORMATION |
|---|---|---|
| A | 10 | – |
| B | 11 | 6 |
| C | 11 | 7 |
| D | 12 | 7 |

MEMORY SYSTEM

CROSS-REFERENCE TO RELATED APPLICATION

This application is based upon and claims the benefit of priority from Japanese Patent Application No. 2021-152897, filed Sep. 21, 2021, the entire contents of which are incorporated herein by reference.

FIELD

Embodiments described herein relate generally to a memory system.

BACKGROUND

When garbage collection (compaction) is executed, there is a technique for selecting a logical block of a garbage collection target based on the number of valid data in a memory block.

DESCRIPTION OF THE DRAWINGS

FIG. 8A is a diagram illustrating an example of second valid data management information according to a second embodiment.

FIG. 8B is a diagram illustrating an example of calculating the number of valid data of a bank of a selected logical block and the number of valid data of a bank of a logical block of a garbage collection target candidate according to the second embodiment.

FIG. 8C is a diagram illustrating an example of a second tabulation table according to the second embodiment.

DETAILED DESCRIPTION

Embodiments provide a memory system with which it is possible to appropriately select a logical block of a garbage collection target.

In general, according to one embodiment, a memory system includes a memory and a controller. The memory is configured to store a number of valid data in each of a plurality of logical blocks and a number of valid data for each of a plurality of banks in each of the logical blocks. The controller is configured to: select logical blocks of garbage collection target candidates based on the numbers of valid data in the logical blocks; calculate a maximum value among the numbers of valid data for the banks in each of the logical blocks of the garbage collection target candidates as a respective comparison value; and select one of the logical blocks of the garbage collection targets based on comparing the respective comparison values of the logical blocks of the garbage collection target candidates with each other.

Hereinafter, a memory system according to an embodiment will be described in detail with reference to the accompanying drawings. The present disclosure is not limited to the following embodiments.

First Embodiment

Figure 1:
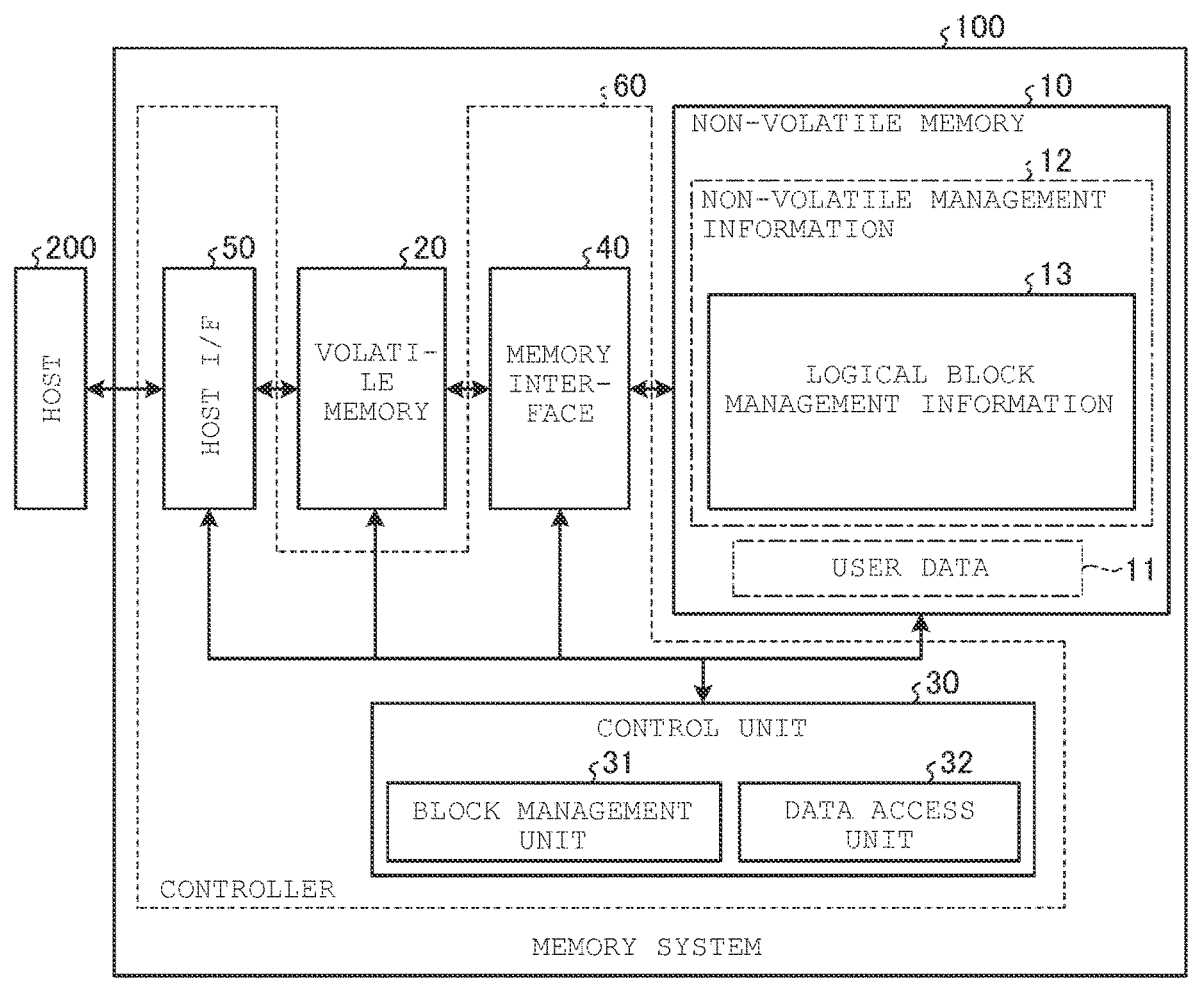
FIG. 1 is a diagram illustrating an example of a configuration of a memory system according to a first embodiment.

FIG. 1 is a block diagram illustrating a schematic configuration example of a memory system according to a first embodiment. The memory system according to the first embodiment includes a non-volatile memory. The memory system writes data to the non-volatile memory, reads the data stored in the non-volatile memory, and erases the data stored in the non-volatile memory. The non-volatile memory includes a plurality of physical blocks which are the smallest units of erasure.

More specifically, the memory system 100 may be configured as illustrated in FIG. 1. FIG. 1 is a diagram illustrating a configuration of the memory system 100.

The memory system 100 is, for example, a solid state drive (SSD). The memory system 100 can be connected to a host 200 via a host interface (a host I/F) 50. The memory system 100 functions as an external storage device of the connected host 200. The host 200 is, for example, a CPU of a personal computer and a CPU of an image capturing device such as a still camera, a video camera, or the like. The memory system 100 includes a non-volatile memory 10, a volatile memory 20, and a controller 60. The controller is also referred to as a memory controller. The controller 60 includes a control unit 30, a memory interface 40, and the host interface 50. The non-volatile memory 10 is a semiconductor memory that can store data in a non-volatile manner, such as a NAND flash memory or the like. The volatile memory 20 is a semiconductor memory that has a higher access speed than the non-volatile memory 10. The controller 60 is configured as, for example, a system on chip (SoC). The volatile memory 20 may be provided outside the controller 60 or may be built in the controller 60.

The non-volatile memory 10 stores user data 11 designated by the host 200, and stores information on an operation of the volatile memory 20 as non-volatile management information 12. The non-volatile memory 10 includes a memory cell array in which a plurality of memory cells are located in a matrix shape, and each memory cell can perform multivalued storage by using a plurality of physical pages. The non-volatile memory 10 includes a plurality of memory chips, and each memory chip includes a plurality of physical blocks which are units of data erasure. In the non-volatile memory 10, data is written and read for each physical page. The physical block is formed of a plurality of physical pages.

Figure 2:
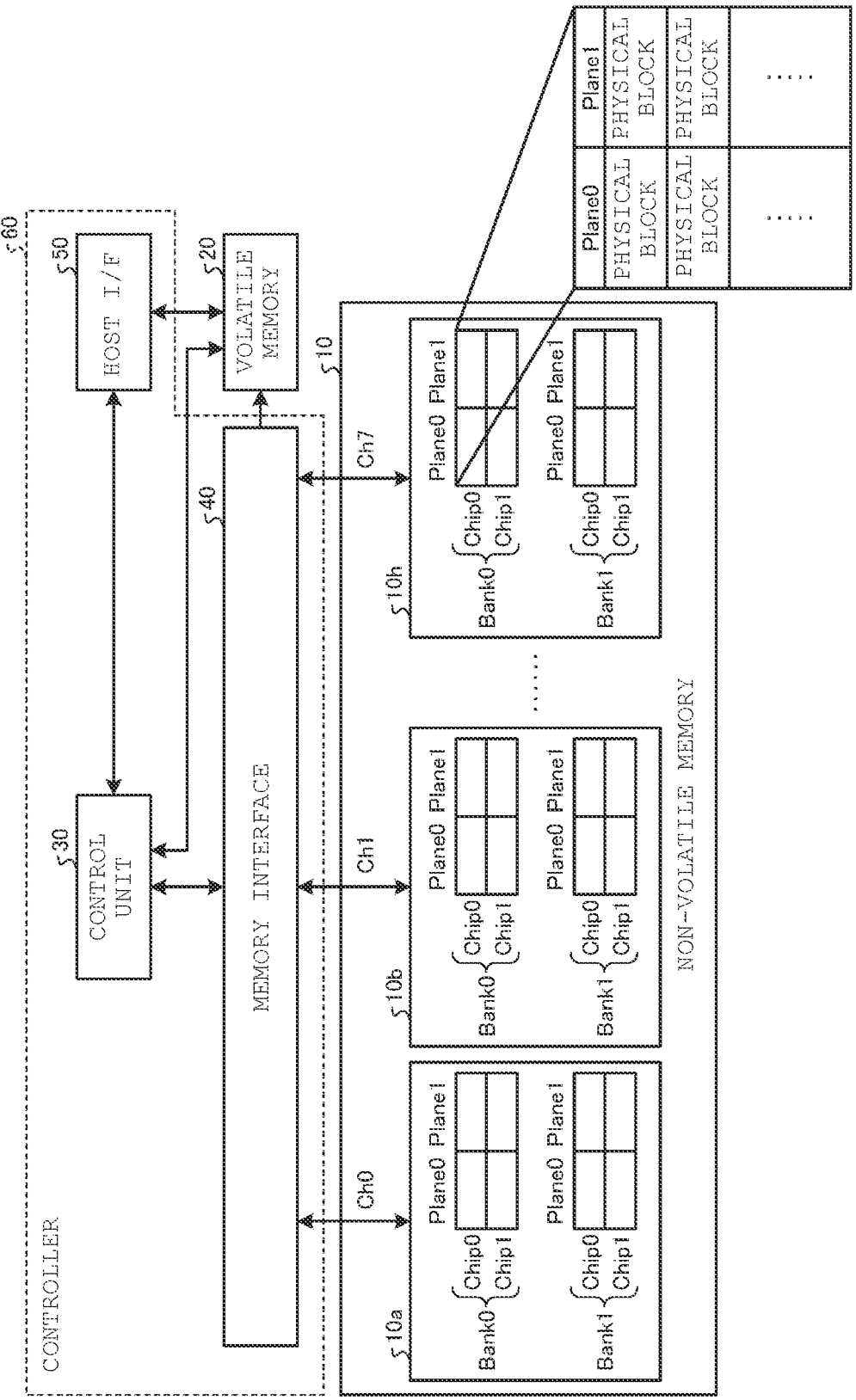
FIG. 2 is a diagram illustrating a configuration of a non-volatile memory according to the first embodiment.

FIG. 2 illustrates a detailed configuration example of the non-volatile memory 10. In this embodiment, the non-volatile memory 10 is connected in parallel to the memory interface 40 of the controller 60 via eight channels Ch0 to Ch7. That is, it is possible to operate eight parallel operation elements 10a to 10h in parallel. The number of channels is not limited to eight, and any number may be adopted. Each of the parallel operation elements 10a to 10h is formed of a plurality of banks (in this case, two banks including a bank 0 and a bank 1) capable of performing bank interleaving. In each of the parallel operation elements 10a to 10h, each bank is formed of a plurality of memory chips (in this case, two memory chips including a chip 0 and a chip 1). Each memory chip is divided into, for example, two areas (District) of a plane 0 and a plane 1 respectively including a plurality of physical blocks. The plane 0 and the plane 1 include peripheral circuits (for example, a row decoder, a column decoder, a page buffer, a data cache, or the like) that are independent of each other, and can perform erasing, writing, and reading in parallel by using a plane double speed mode.

The non-volatile memory 10 can perform a parallel operation by a plurality of channels, a parallel operation by a plurality of banks, and a parallel operation by a double speed mode using a plurality of planes, and can operate a maximum of 32 physical blocks in parallel when the number of channels is 8, the number of banks is 2, and the number of planes is 2. That is, the controller 60 is connected to a plurality of physical blocks via a plurality of channels, and can operate the plurality of physical blocks in parallel.

The volatile memory 20 includes a storage area as a write buffer that temporarily stores data when the data from the host 200 is written to the non-volatile memory 10, a storage area for storing or updating management information such as the non-volatile management information 12 or the like, and a work area for temporarily storing the data read from the non-volatile memory 10.

When outputting a read request or a write request to the memory system 100, the host 200 inputs, to the memory system 100, a logical block address (LBA) as a logical address via the host interface 50. The LBA is a logical address in which a sector (a size: for example, 512B) is consecutively numbered from 0.

In the memory system 100, the controller 60 forms a virtual block referred to as a logical block as a unit to collectively manage a plurality of physical blocks. The controller 60 forms a logical block by combining physical blocks capable of performing channel parallel, bank interleaving, and plane double speed operation. That is, the logical block is formed of the physical blocks corresponding to the number of channels×the number of banks×the number of planes. In the case of FIG. 2, the number of channels=8, the number of planes=2, and the number of banks=2, and the logical block may be formed of a maximum of 32 physical blocks.

A media block address (MBA) is used as a logical address when the logical block is formed. The MBA is a logical address designated in the memory system 100 and is distinguished from the LBA as a logical address designated by the host. The logical block may be formed of only physical blocks for a plurality of channels, or may be formed of only physical blocks for a plurality of banks, or may be formed of only physical blocks for a plurality of planes. The physical blocks may be combined with each other so that the channel parallel and the bank interleaving can be performed, or the physical blocks may be combined with each other so that the channel parallel and the plane double speed operation can be performed, or the physical blocks may be combined with each other so that the bank interleaving and the plane double speed operation can be performed.

The non-volatile management information 12 illustrated in FIG. 1 is information in which management information used in the memory system 100 becomes nonvolatile. When generating or updating the management information, the controller 60 stores the generated or updated management information in the non-volatile memory 10 and makes the stored management information nonvolatile. The non-volatile management information 12 includes a logical-to-physical address conversion table (not illustrated), logical block management information 13, or the like. The logical-to-physical address conversion table is information for managing correspondence between the LBA, which is the logical address designated by the host 200, and a physical address, which represents a storage location of the data in the non-volatile memory 10. The logical block management information 13 is information for managing a plurality of logical blocks formed in the memory system 100.

The memory interface 40 performs an interface process with the non-volatile memory 10. The memory interface 40 writes, based on the control of the control unit 30, the data temporarily stored in the volatile memory 20 to the non-volatile memory 10, or reads the data stored in the non-volatile memory 10 and transfers the read data to the volatile memory 20.

A function of the control unit 30 is implemented by a system program (firmware) stored in the non-volatile memory 10 and a processor that executes the firmware. A part or all of the processes executed by the control unit 30 may be executed by dedicated hardware in the controller 60. The control unit 30 includes a data access unit 32 and a block management unit 31. The data access unit 32 executes a write process to the non-volatile memory 10 via the write buffer of the volatile memory 20, a read process from the non-volatile memory 10, data organization in the non-volatile memory 10 (for example, garbage collection, compaction, and refresh), or the like. The garbage collection and the compaction are processes that generate a new free block (a logical block that does not include valid data) by collecting valid data in the logical block and rewriting the collected valid data to another logical block. The data access unit 32 collects bank information of a logical block 150 during the write process and the read process as access information.

The block management unit 31 performs a formation process of the logical block when first power is input at a manufacturing stage of the memory system, and registers a formation result thereof in the logical block management information 13. Here, a relationship between the physical block and the logical block will be described with reference to FIG. 3.

Figures 3, 4, 5:
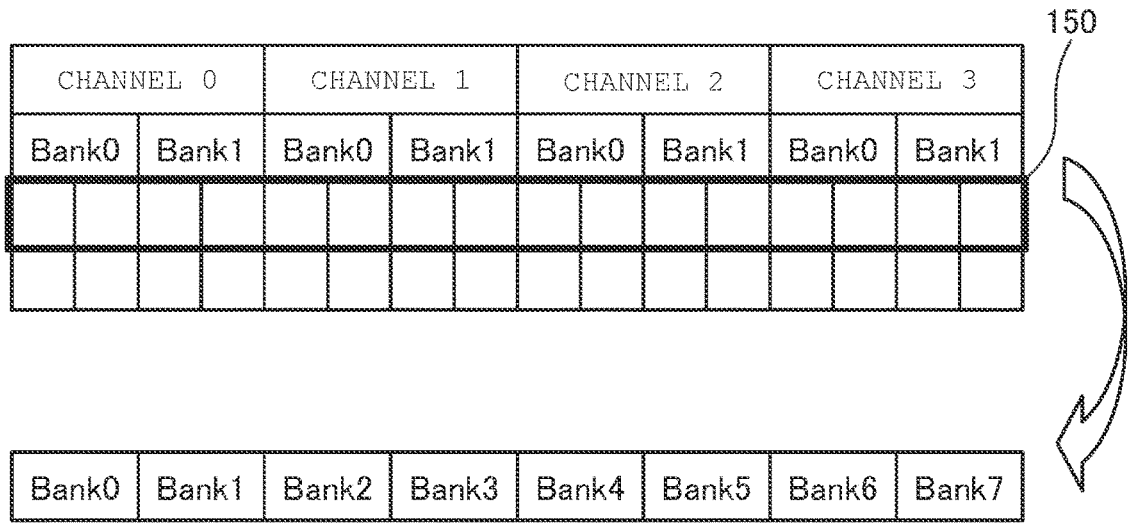
FIG. 3 is a diagram illustrating a relationship between a physical block and a logical block according to the first embodiment.
FIG. 4 is a diagram illustrating an example of first valid data management information according to the first embodiment.
FIG. 5 is a diagram illustrating an example of second valid data management information according to the first embodiment.

FIG. 3 is a diagram illustrating the relationship between the physical block and the logical block. As illustrated in FIG. 3, when a first bank and a second bank (e.g., a bank 0 and a bank 1) exist in each of channels 0 to 3, the block management unit 31 forms the bank 0 and the bank 1 as one logical block 150. In this case, the block management unit 31 sets eight banks corresponding to the logical block 150 as a bank 0 to a bank 7. In this manner, the block management unit 31 forms the logical block 150 including a plurality of banks.

As described above, when executing the garbage collection, the data access unit 32 generates a new free block by collecting valid data in the logical block 150 and rewriting the collected valid data to another logical block 150. That is, the data access unit 32 reads the valid data of the logical block 150 serving as a movement source of the valid data and writes the read valid data to the logical block 150 serving as a movement destination of the valid data. Hereinafter, the logical block 150 serving as the movement source of the valid data is also referred to as the logical block 150 of a garbage collection target.

In order for the data access unit 32 to efficiently execute the garbage collection, in consideration of a processing load of reading the valid data and writing the read valid data to the logical block 150 serving as the movement destination of the valid data, it is desirable that a small number of valid data of the logical block 150 of the garbage collection target are read by the data access unit 32.

Therefore, it is conceivable to have a logical block including a small number of valid data as a garbage collection target. However, when a plurality of banks are associated with a logical block, it is conceivable to perform a read operation in parallel on a per bank basis. At this time, when the valid data is biased to a predetermined bank in the banks of the logical block, it takes longer time to read the valid data than a case where the valid data uniformly exists in any one of the banks.

Therefore, the memory system 100 according to the embodiment appropriately selects the logical block of the garbage collection target in consideration of the read time of the logical block.

The memory system 100 selects the logical block of the garbage collection target based on first valid data management information and second valid data management information stored in the non-volatile memory 10, and executes the garbage collection based on the selected logical block.

First, FIG. 4 illustrates an example of the first valid data management information. The first valid data management information is information indicating the number of valid data in the logical block. The first valid data management information illustrated in FIG. 4 shows that the number of valid data of a logical block A is 100 and the number of valid data of a logical block B is 150. The first valid data management information may include information indicating the number of banks of each logical block. The number of banks of each logical block of the first valid data management information illustrated in the example of FIG. 4 is 4.

Continuously, FIG. 5 illustrates an example of the second valid data management information. The second valid data management information is information indicating the number of valid data for each bank in the logical block. For example, the second valid data management information illustrated in FIG. 5 shows that the number of valid data of a bank 0 of a logical block A is 2, the number of valid data of a bank 1 of the logical block A is 0, the number of valid data of a bank 2 of the logical block A is 15, and the number of valid data of a bank 3 of the logical block A is 2.

The data access unit 32 selects the logical block 150 of the garbage collection target based on the first valid data management information and the second valid data management information when performing the garbage collection.

The data access unit 32 uses the first valid data management information to generate write guide information which is information serving as a guide for the time required for writing the valid data in the logical block 150. Specifically, the data access unit 32 generates the write guide information by dividing the number of valid data by the number of banks, with respect to each of the logical blocks of the first valid data management information. When the first valid data management information has the number of banks, the data access unit 32 specifies the write guide information based on the number of banks. The data access unit 32 may specify the number of banks from the second valid data management information. On the assumption that the valid data of the logical block 150 of the garbage collection target is written in parallel to each physical block of the logical block 150 serving as the movement destination, the data access unit 32 divides the number of valid data by the number of banks.

The data access unit 32 uses the second valid data management information to generate read guide information which is information serving as a guide for the time required for reading the valid data in the logical block 150. The read guide information is an example of a comparison value. Specifically, the data access unit 32 uses a maximum value among the respective numbers of valid data in its banks as the read guide information, with respect to each of the logical blocks of the second valid data management information. For example, in the case of the logical block A illustrated in FIG. 5, since the bank 2 has the largest number of valid data, the data access unit 32 sets the read guide information of the logical block A to 15. When reading the valid data in the logical block 150 of the garbage collection target in parallel in each block, the data access unit 32 uses the maximum value of the number of valid data in each bank as the read guide information on the assumption of a block that takes the longest time.

Next, a method in which the data access unit 32 selects the logical block 150 of the garbage collection target by using the write guide information and the read guide information will be described with reference to FIG. 6.

Figure 6:
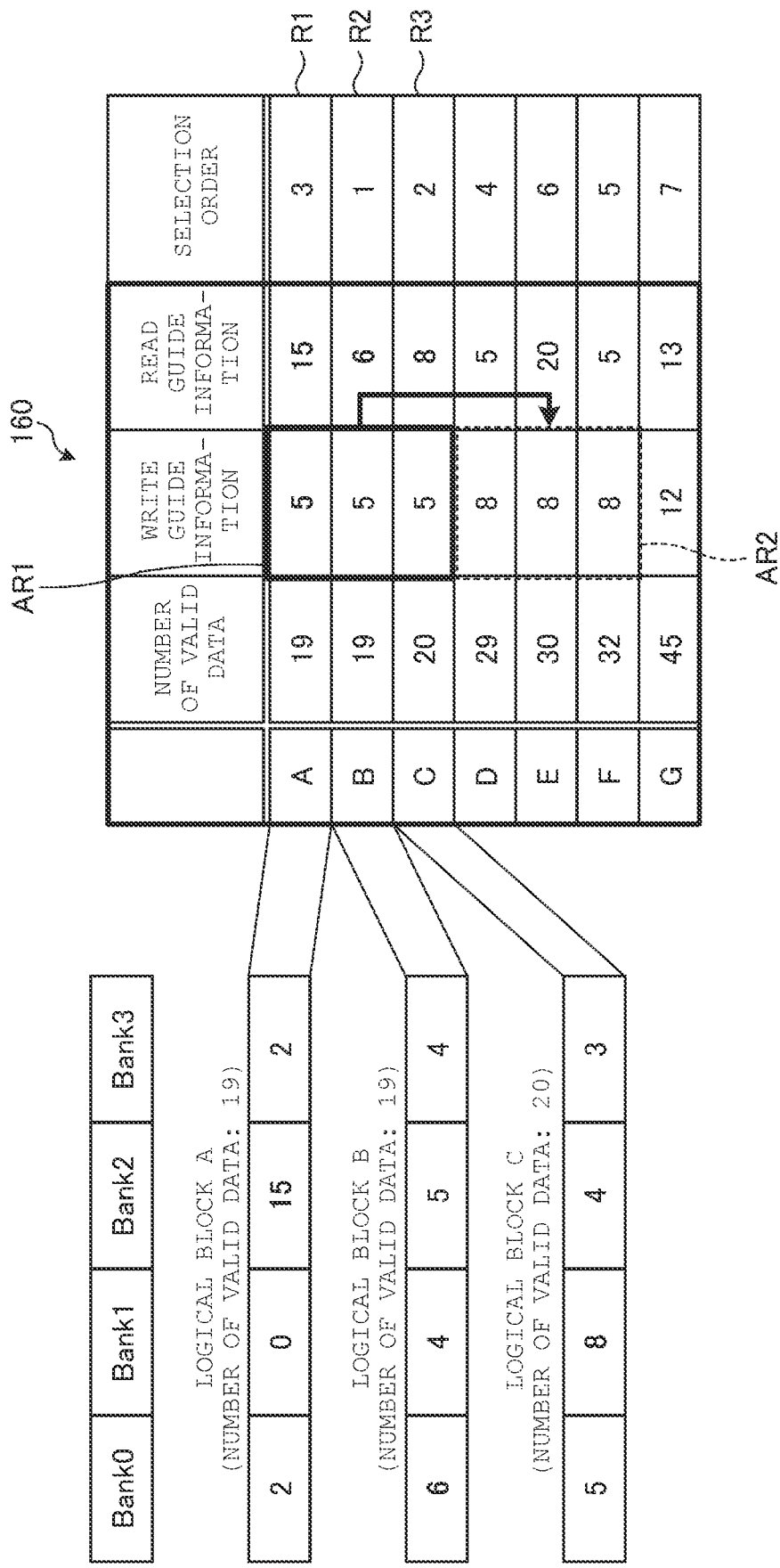
FIG. 6 is a diagram illustrating a method for selecting a logical block of a garbage collection target according to the first embodiment.

FIG. 6 is a diagram illustrating a method for selecting the logical block 150 of the garbage collection target based on the write guide information and the read guide information. As illustrated in FIG. 6, the number of valid data of a logical block A (a total of valid data in a bank of the logical block A) is 19, the number of valid data of a logical block B is 19, and the number of valid data of a logical block C is 20. The number of valid data from a bank 0 to a bank 3 of the logical block A is 2, 0, 15, and 2, respectively. The number of valid data from the bank 0 to the bank 3 of the logical block B is 6, 4, 5, and 4, respectively.

First, the data access unit 32 sorts, based on the first valid data management information, the logical blocks 150 in ascending order of the number of valid data (a first process). Next, the data access unit 32 calculates, based on the first valid data management information, the write guide information for each logical block 150 (a second process). The data access unit 32 calculates the read guide information based on the second valid data management information (a third process).

A table illustrated in FIG. 6 is a tabulation table 160 for selecting the logical block 150 of the garbage collection target. The tabulation table 160 illustrated in FIG. 6 is a table based on the results of executing the first to third processes.

The data access unit 32 sets an area of candidates for the garbage collection target in ascending order of the number of pieces of the write guide information. In the tabulation table 160 of FIG. 6, as a result of comparing pieces of the respective read guide information of the logical blocks with each other, the data access unit 32 sets, as the logical block of the garbage collection target, the logical block 150 having the least read guide information among the logical blocks belonging to an area AR1. In the case of the table of FIG. 6, the data access unit 32 compares record information R1 of the logical block A, record information R2 of the logical block B, and record information R3 of the logical block C which belong to the area AR1, and sets the logical block B having the least read guide information as the logical block of the garbage collection target. The data access unit 32 continuously sets the logical block C, which has the second least read guide information next to the logical block B, as the logical block of the garbage collection target. The data access unit 32 continuously sets the logical block A, which has the third least read guide information next to the logical block C, as the logical block of the garbage collection target. Continuously, the data access unit 32 sets a new area AR2 and selects, based on the read guide information, the logical block of the garbage collection target from among the logical blocks belonging to the area AR2.

In this manner, when the data access unit 32 reads the respective banks in parallel, a logical block that requires the least amount of time to read its bank(s) is determined as the garbage collection target, thereby making it possible to perform a process of reading the valid data in the garbage collection more efficiently than a case in which the garbage collection target is selected by simply focusing only on the number of valid data.

Figure 7:
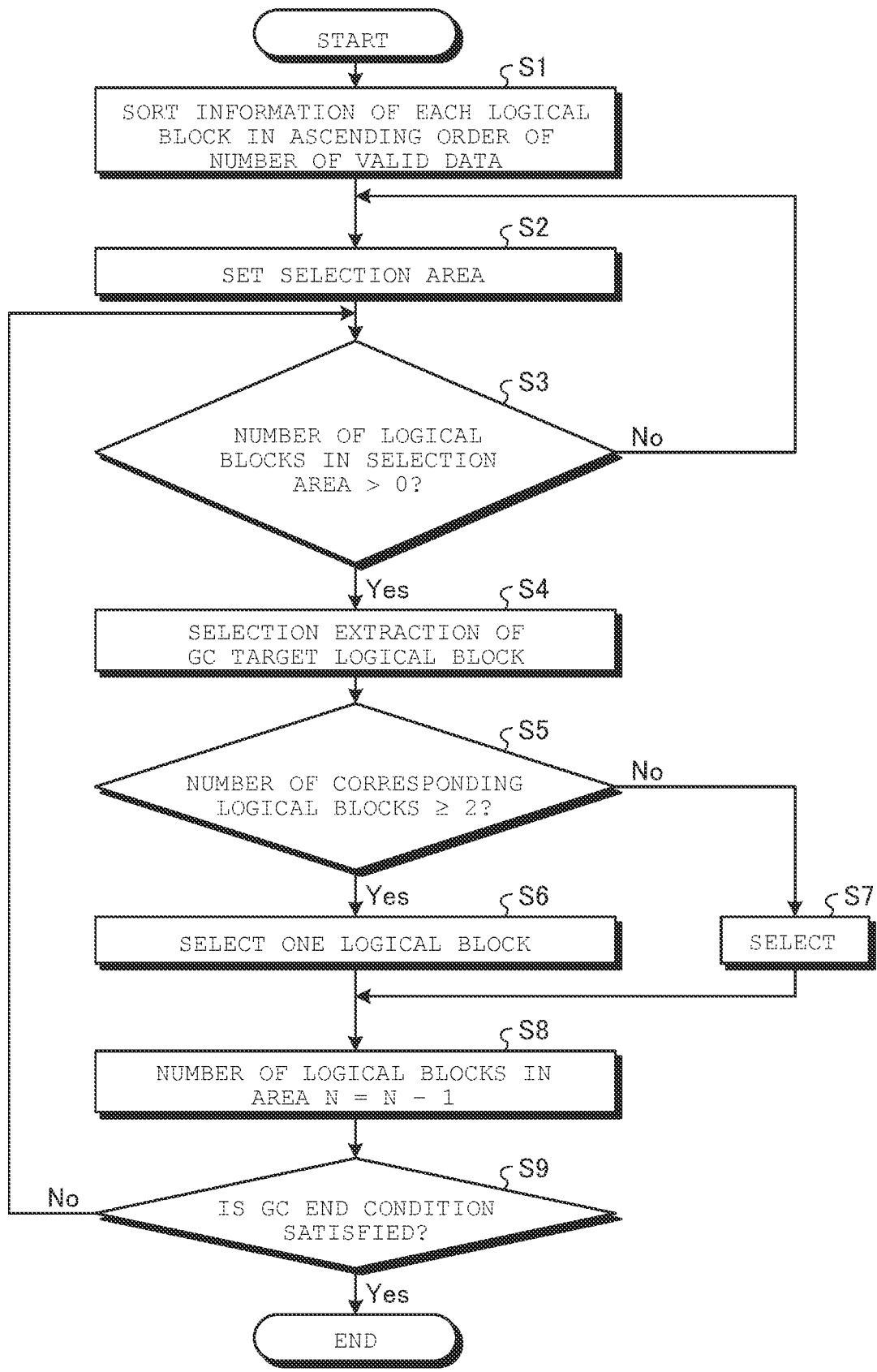
FIG. 7 is a flowchart illustrating a procedure of a process of selecting the garbage collection target according to the first embodiment.

Continuously, a procedure of a process of selecting the logical block of the garbage collection target according to the first embodiment will be described with reference to FIG. 7. FIG. 7 is a flowchart illustrating the procedure of the process of selecting the garbage collection target according to the first embodiment.

First, the data access unit 32 sorts, based on the first valid data management information, the logical blocks 150 in ascending order of the number of valid data. Next, the data access unit 32 calculates, based on the first valid data management information, the write guide information for each logical block 150. The data access unit 32 calculates the read guide information based on the second valid data management information. The data access unit 32 generates a table based on the sort result, the write guide information, and the read guide information (step S1). The data access unit 32 sets a selection area AR based on the generated tabulation table 160 (step S2).

When the number of logical blocks not selected as the logical block of the garbage collection target in the selection area AR is greater than 0 (step S3: Yes), the data access unit 32 compares pieces of the read guide information of the logical blocks in the selection area AR with each other, and extracts the logical block of the garbage collection target (step S4). When the number of logical blocks not selected as the logical block of the garbage collection target in the selection area AR is 0 (step S3: No), the process proceeds to step S2, and the data access unit 32 newly sets the selection area AR.

In step S5, when the number of logical blocks of the garbage collection targets extracted by the data access unit 32 is equal to or greater than 2 (step S5: Yes), the data access unit 32 selects one logical block (step S6). For example, the data access unit 32 preferentially selects the logical block having the smaller number of erasure times of each logical block. When the number of logical blocks of the garbage collection targets extracted by the data access unit 32 is one (step S5: No), the data access unit 32 selects the logical block (step S7).

In step S8, the data access unit 32 decrements a numerical value indicating the number of unselected logical blocks in the selection area (step S8). Next, the data access unit 32 determines whether a garbage collection end condition is satisfied (step S9). The garbage collection end condition is that a total capacity of the selected logical blocks is equal to or greater than the required number of free blocks.

When the garbage collection end condition is not satisfied (step S9: No), the process proceeds to step S3, and when the garbage collection end condition is satisfied (step S9: Yes), the process ends. The data access unit 32 reads valid data from the selected logical block and writes the read valid data to a logical block serving as a write destination, thereby executing the garbage collection.

The memory system 100 according to the first embodiment calculates, based on the number of valid data for each bank in the logical block 150, the maximum value of the number of valid data for each bank in the logical block as the read guide information, and selects the logical block of the garbage collection target based on a result of comparing pieces of the read guide information of the logical blocks 150 with each other.

When reading the valid data in parallel from a plurality of banks of the logical block 150, the memory system 100 calculates the read guide information of the read time, and selects the logical block of the garbage collection target by using this read guide information, thereby making it possible to preferentially select a logical block that requires a short read time. That is, the memory system 100 can appropriately select the logical block of the garbage collection target.

Second Embodiment

When selecting a plurality of logical blocks of the garbage collection target, the memory system 100 according to a second embodiment selects a logical block to be selected next in consideration of the number of valid data of each bank in a logical block selected first.

A procedure in which the memory system 100 according to the second embodiment selects the logical block of the garbage collection target will be described with reference to FIGS. 8A to 8C.

FIG. 8A is a diagram illustrating an example of second valid data management information according to the second embodiment. It is assumed that the data access unit 32 selects the logical block A as the logical block of the garbage collection target by using the method described in the first embodiment. In this case, the data access unit 32 adds the number of valid data of each bank of the logical block A to the number of valid data of each bank of the other logical blocks.

FIG. 8B is a diagram illustrating an example of calculating the number of valid data of each bank of the selected logical block and the number of valid data of each bank of the logical block B which is a logical block of a garbage collection target candidate.

As illustrated in FIG. 8B, the data access unit 32 adds the number of valid data of each bank of the selected logical block A to the number of valid data of each bank of the unselected logical block B. The data access unit 32 uses the maximum value among the added values as second read guide information. The second read guide information is an example of a comparison value. In this manner, the data access unit 32 adds the number of valid data of each bank of the selected logical block to the number of valid data of each bank of the logical block of the garbage collection target candidate, thereby calculating an estimated value of a read load when a plurality of logical blocks are read for each bank. The number of valid data of the selected logical block to be added is the number of valid data of a most recently selected logical block. The most recently selected logical block is, for example, a logical block in which a logical block of a first garbage collection target is most recently selected when a logical block of a second garbage collection target is intended to be selected.

The data access unit 32 generates a second tabulation table associated with the second read guide information for each logical block. FIG. 8C illustrates an example of the second tabulation table. As illustrated in FIG. 8C, a second tabulation table 170 associates the logical block with the number of valid data in the logical block and the second read guide information.

When selecting the logical block of the next garbage collection target based on the second tabulation table 170 illustrated in FIG. 8C, the data access unit 32 compares pieces of the respective second read guide information of the logical blocks of the garbage collection target candidates in the selection area AR with each other, and selects the logical block B having the least second read guide information.

Figure 9:
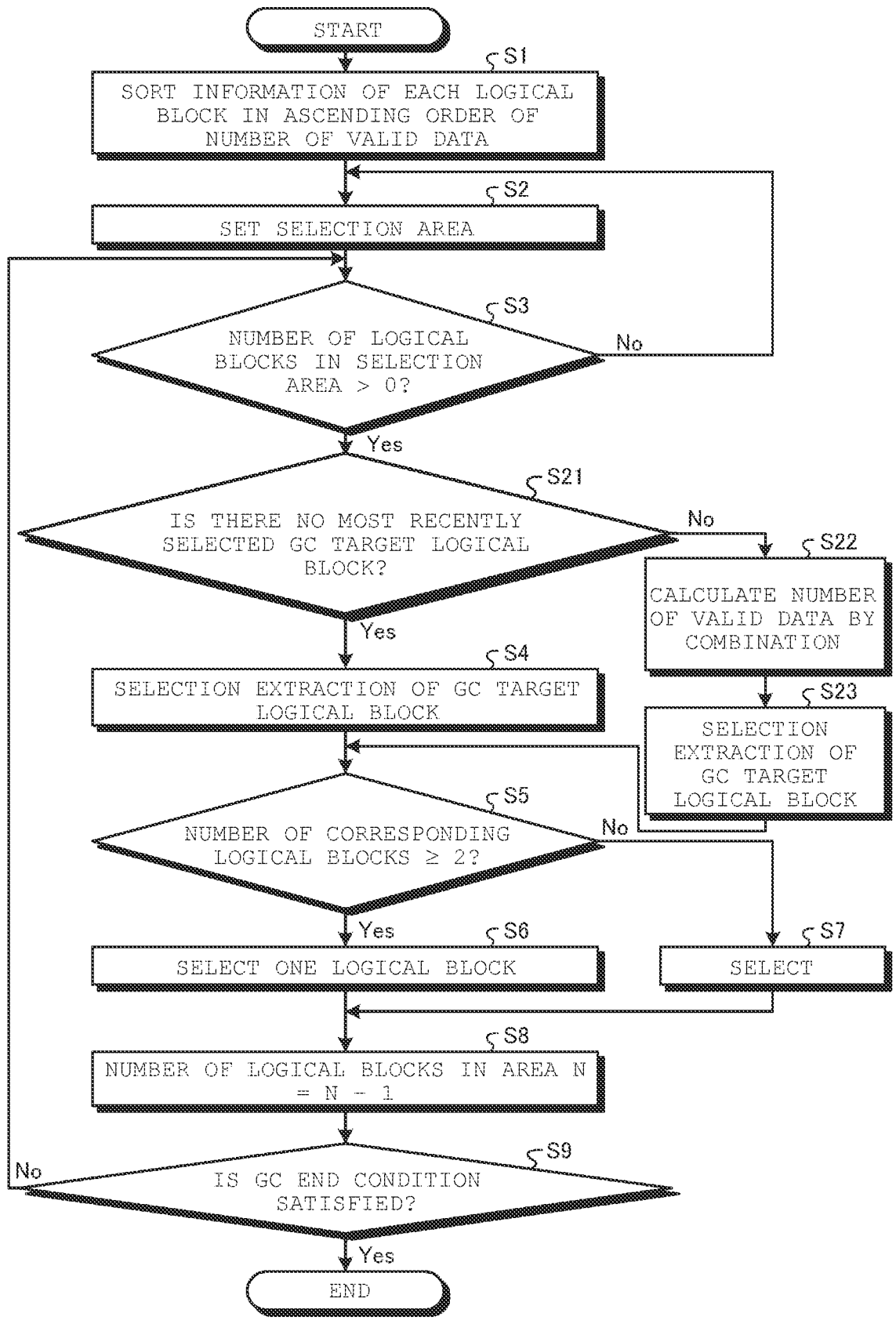
FIG. 9 is a flowchart illustrating a procedure of a process of selecting a garbage collection target according to the second embodiment.

Continuously, a procedure of a process of selecting the logical block of the garbage collection target according to the second embodiment will be described with reference to FIG. 9. FIG. 9 is a flowchart illustrating the procedure of the process of selecting the garbage collection target according to the second embodiment.

The same process as the step of the flowchart according to the first embodiment illustrated in FIG. 7 will be denoted by the same reference sign, and the description thereof will be omitted. In the flowchart according to the first embodiment, when the number of logical blocks not selected as the logical block of the garbage collection target in the selection area AR is greater than 0 (step S3: Yes), the process proceeds to step S4. In the flowchart according to the second embodiment, when the condition of step S3 is satisfied, it is determined whether there is the most recently selected logical block of the garbage collection target, and the method for selecting the logical block is changed depending on a determination result thereof. Specifically, when the number of logical blocks not selected as the logical block of the garbage collection target in the selection area AR is greater than 0 (step S3: Yes), the data access unit 32 determines presence or absence of the selected logical block (step S21), when there is no selected logical block (step S21: Yes), the process proceeds to step S4, and when there is the selected logical block (step S21: No), the process proceeds to step S22.

In step S22, the data access unit 32 adds the number of valid data of each bank of the selected logical block to the number of valid data of each bank of the unselected logical block, thereby calculating the second read guide information. Next, the data access unit 32 generates the second tabulation table 170 including the second read guide information (step S22). The data access unit 32 refers to the second tabulation table 170, compares pieces of the respective second read guide information of the logical blocks of the garbage collection target candidates in the selection area AR with each other, and selects the logical block of the garbage collection target (step S23), and then the process proceeds to step S5.

The memory system 100 according to the second embodiment calculates the second read guide information which is the maximum value as a result of adding the number of valid data for each bank in the logical block to the number of valid data for each bank of the logical block of the garbage collection target selected immediately before, and selects the logical block of the garbage collection target based on the calculated second read guide information.

In this case, the memory system 100 selects the logical block of the garbage collection target based on the second read guide information also including the read time of each bank of the selected logical block. Accordingly, when reading a plurality of logical blocks 150 and performing the garbage collection, the memory system 100 can select the logical block 150 that requires a short read time in total among the plurality of logical blocks 150.

Third Embodiment

A third embodiment describes a method for selecting a logical block when the logical block is selected based on the second read guide information described in the second embodiment and there are a plurality of logical blocks having the same second read guide information.

For example, when there are a plurality of logical blocks having the same second read guide information, as described in the first embodiment, for example, the data access unit 32 preferentially selects the logical block having the smaller number of erasure times of each logical block. In this case, selection schedule information indicating the next selection priority is attached to a logical block not selected, and when selecting the next logical block, the data access unit 32 selects the logical block to which the selection schedule information indicating the next selection priority is attached.

Figure 10:
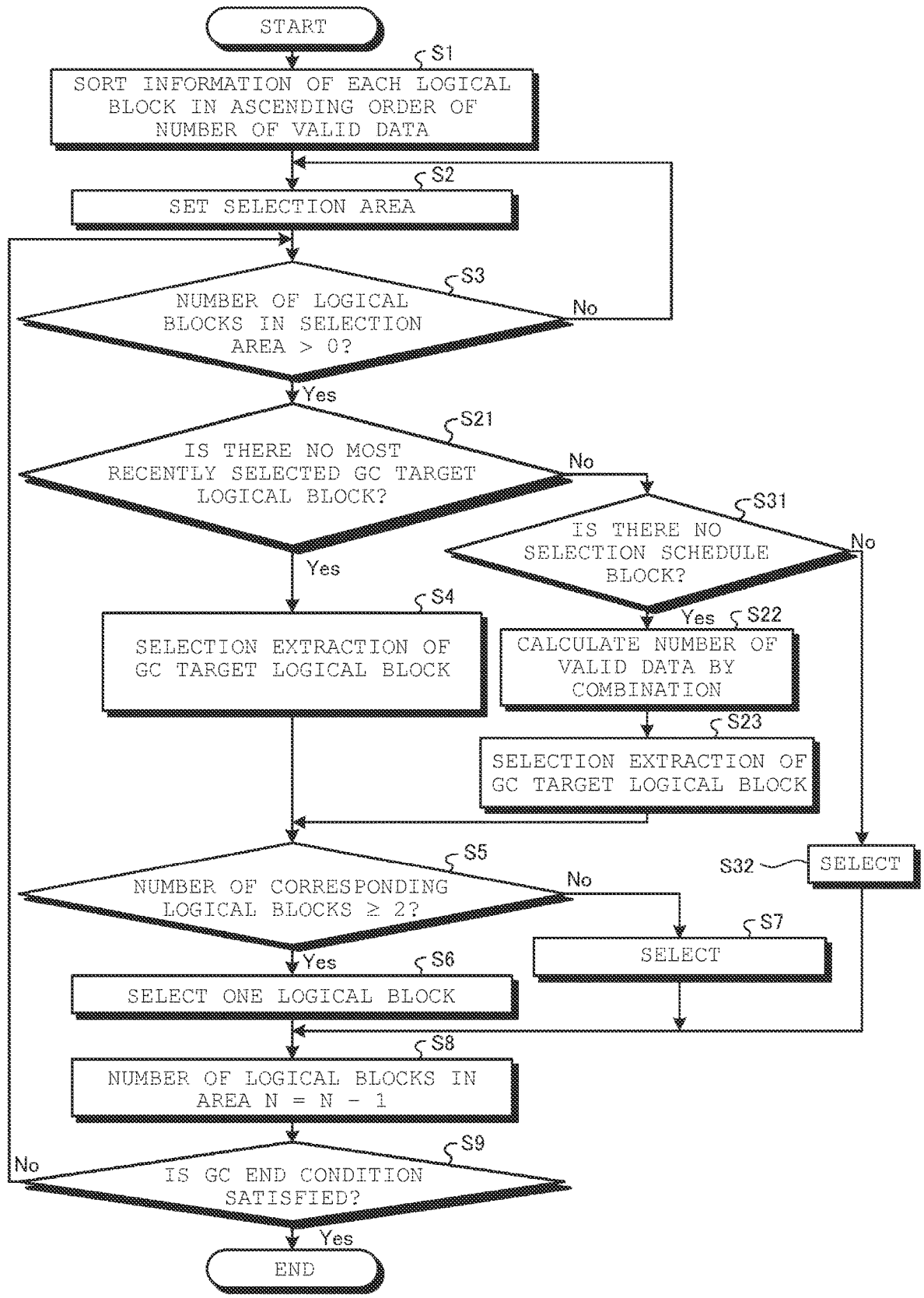
FIG. 10 is a flowchart illustrating a procedure of a process of selecting a garbage collection target according to a third embodiment.

A procedure of a process of selecting a logical block of a garbage collection target according to the third embodiment will be described with reference to FIG. 10. FIG. 10 is a flowchart illustrating the procedure of the process of selecting the garbage collection target according to the third embodiment.

The same process as the step of the flowchart according to the first and second embodiments will be denoted by the same reference sign, and the description thereof will be omitted.

When it is determined whether there is the selected logical block and there is the selected logical block (step S21: No), it is determined whether there is the logical block to which the selection schedule information is attached, and when there is no logical block to which the selection schedule information is attached (step S31: Yes), the process proceeds to step S22.

In step S31, when it is determined whether there is the logical block to which the selection schedule information is attached and there is the logical block to which the selection schedule information is attached (step S31: No), the data access unit 32 selects the logical block to which the selection schedule information is attached as the logical block of the garbage collection target (step S32), and the process proceeds to step S8.

When there are a plurality of logical blocks 150 having the same second read guide information, the memory system 100 according to the third embodiment selects any one of the logical blocks 150, and selects the others from the next time.

In this case, the memory system 100 can consecutively select a plurality of logical blocks 150 having no difference in read time.

Fourth Embodiment

In a fourth embodiment, the logical block 150 of the garbage collection target is selected by further using information on an access status of the bank of the logical block 150.

Specifically, the data access unit 32 acquires the information on the access status. Next, the data access unit 32 refers to the information on the access status, extracts the logical block 150 having the valid data only in a bank not being read or written of the logical block 150 in the selection area AR, and extracts the logical block 150 having the least read guide information of the extracted logical block 150.

Figure 11:
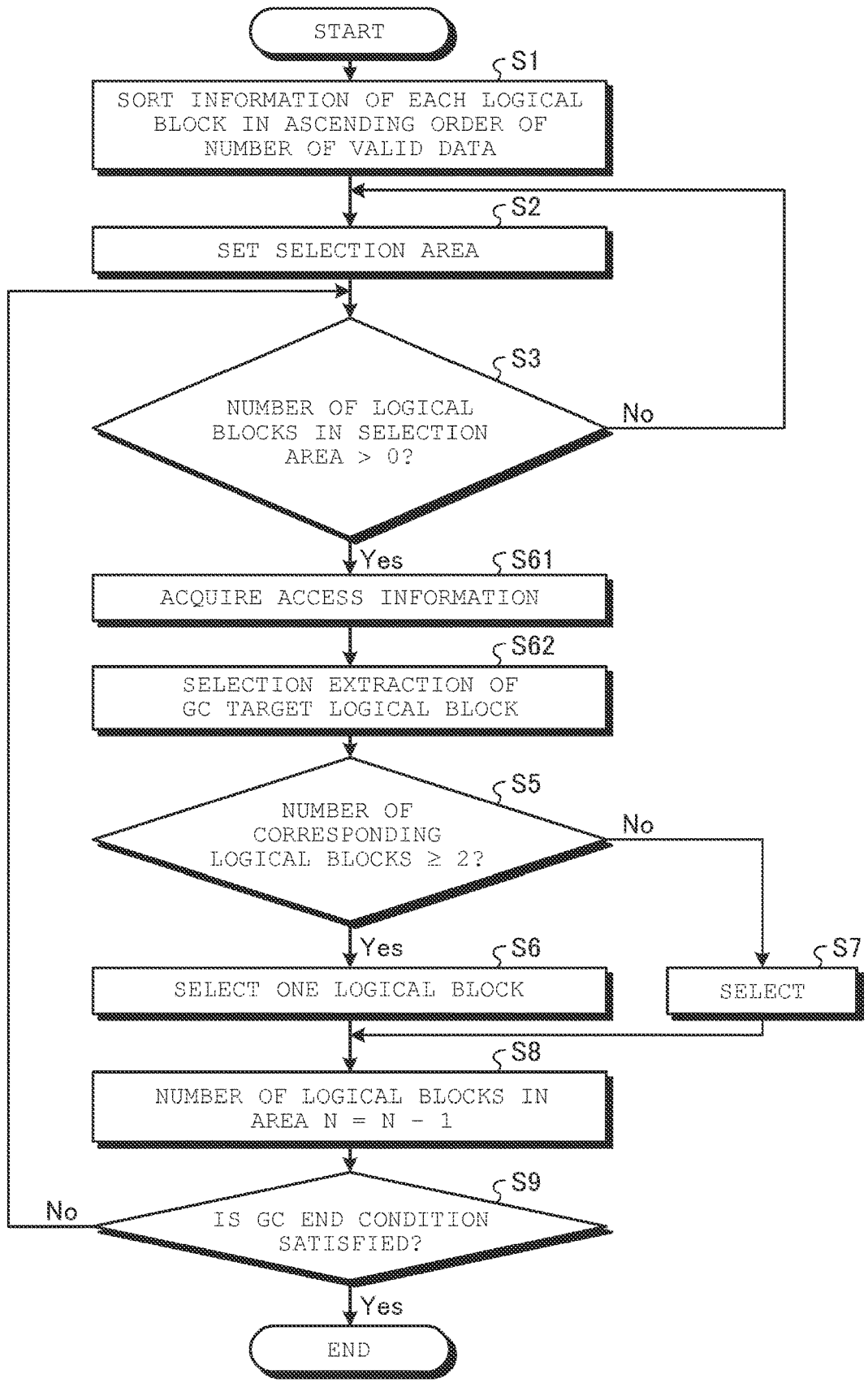
FIG. 11 is a flowchart illustrating a procedure of a process of selecting a garbage collection target according to a fourth embodiment.

A procedure of a process of selecting a logical block of a garbage collection target according to the fourth embodiment will be described with reference to FIG. 11. FIG. 11 is a flowchart illustrating the procedure of the process of selecting the garbage collection target according to the fourth embodiment.

The same process as the step of the flowchart according to the first embodiment will be denoted by the same reference sign, and the description thereof will be omitted.

When the number of logical blocks not selected as the logical block of the garbage collection target in the selection area AR is greater than 0 (step S3: Yes), instead of step S4, the data access unit 32 acquires information on an access status (step S61), refers to the information on the access status, extracts the logical block 150 having the valid data only in a bank not being read or written of the logical block 150 in the selection area AR, and extracts the logical block 150 having the least read guide information of the extracted logical block 150 (step S62).

The memory system 100 according to the fourth embodiment selects the logical block of the garbage collection target further based on the access information of the bank of the logical block 150.

In this case, the memory system 100 can select the logical block 150 of the garbage collection target depending on the access status to the bank of the logical block 150.

Fifth Embodiment

In a fifth embodiment, when the read guide information is generated, weighting is performed based on a type of a page to which the valid data of each bank belongs.

Read time of the valid data page is different depending on whether the page is Lower, Middle, or Upper. The data access unit 32 generates the read guide information based on this point. The number of valid data for each bank in the second valid data management information is stored for each page type. The data access unit 32 acquires read reference time of each of Lower, Middle, and Upper. This reference time may be stored in the non-volatile memory 10 or may be stored by the data access unit 32.

The data access unit 32 calculates the read time of each bank of the logical block 150 by the following Equation (1).

Read time of valid data of each bank=number of valid data of Lower×reference time of Lower+ number of valid data of Middle×reference time of Middle+number of valid data of Upper×reference time of Upper (Equation 1)

The data access unit 32 uses a maximum value of the read time of each bank as the read guide information for each of the logical blocks.

Figure 12:
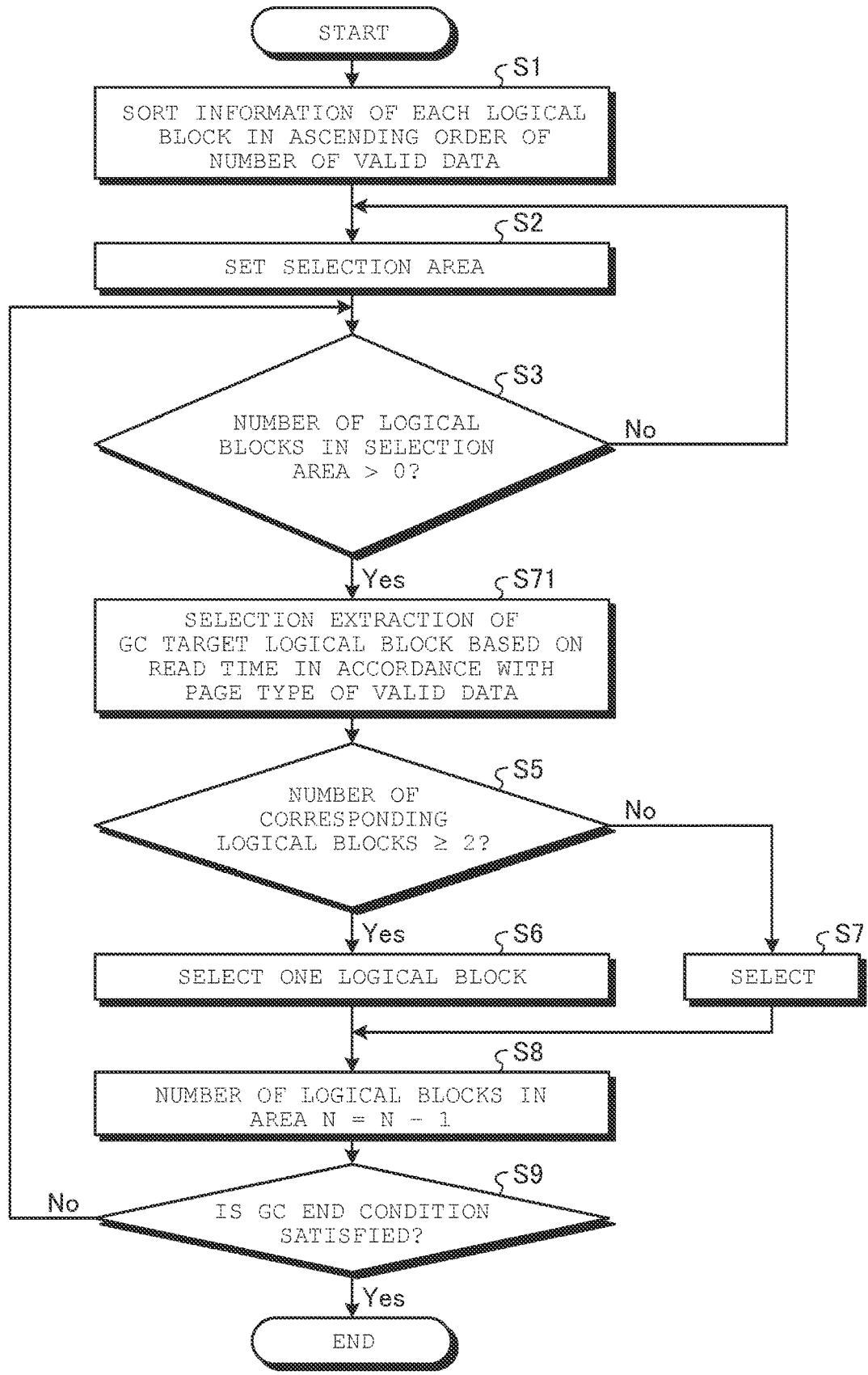
FIG. 12 is a flowchart illustrating a procedure of a process of selecting a garbage collection target according to a fifth embodiment.

A procedure of a process of selecting a logical block of a garbage collection target according to the fifth embodiment will be described with reference to FIG. 12. FIG. 12 is a flowchart illustrating the procedure of the process of selecting the garbage collection target according to the fifth embodiment.

The same process as the step of the flowchart according to the first embodiment will be denoted by the same reference sign, and the description thereof will be omitted.

When the number of logical blocks not selected as the logical block of the garbage collection target in the selection area AR is greater than 0 (step S3: Yes), instead of step S4, the data access unit 32 selects the logical block 150 of the garbage collection target based on the read guide information by the read time of the valid data of each bank of the logical block 150 according to the Equation (1) (step S71).

The memory system 100 according to the fifth embodiment calculates the read time in accordance with the page type of the valid data, and generates the read guide information based on the read time, thereby making it possible to calculate an appropriate read time in accordance with the page type. Accordingly, the memory system 100 can appropriately select the logical block 150 of the garbage collection target by using the read guide information based on the read time.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system, comprising:
a memory configured to store a number of valid data in each of a plurality of logical blocks and a number of valid data for each of a plurality of banks in each of the logical blocks; and
a controller configured to:
select logical blocks of garbage collection target candidates based on the numbers of valid data in the logical blocks;
calculate a maximum value among the numbers of valid data for the banks in each of the logical blocks of the garbage collection target candidates as a respective comparison value;
select one of the logical blocks of the garbage collection targets based on comparing the respective comparison values of the logical blocks of the garbage collection target candidates with each other;
add the number of valid data for each bank in each of the logical blocks to the number of valid data for each bank of one of the logical blocks of the garbage collection targets; and
determine a maximum value among the added numbers of valid data for the banks of each of the logical blocks as the comparison value;
wherein as the result of comparing the respective comparison values of the logical blocks of the garbage collection target candidates with each other, when there are a plurality of logical blocks of the garbage collection target candidates having a minimum comparison value, the controller selects, as the logical block of the garbage collection target, the logical block of one garbage collection target candidate among the logical blocks of the garbage collection target candidates having the minimum comparison value, and selects the logical blocks of other garbage collection target candidates as the logical block of the garbage collection target from the next time.

2. The memory system according to claim 1, wherein the controller is configured to:
calculate an average number of valid data per bank in each of the logical blocks; and select the garbage collection target candidates based on the average numbers of valid data of the logical blocks.

3. The memory system according to claim 1, wherein the memory further stores access information of the banks of each of the logical blocks, and
the controller is configured to select the logical blocks of the garbage collection targets based on the access information.

4. The memory system according to claim 1, wherein the memory stores a page type of each bank in each of the logical blocks, and
the controller is configured to calculate, as the comparison value, a maximum value of values obtained by weighting the number of valid data for each bank in each of the logical blocks in accordance with the page type of each bank.

5. The memory system according to claim 1, wherein the memory is a non-volatile memory.

6. A method, comprising:
selecting logical blocks of garbage collection target candidates based on respective numbers of valid data in a plurality of logical blocks of a memory;
calculating a maximum value among the numbers of valid data for a plurality of banks in each of the logical blocks of the garbage collection target candidates as a respective comparison value;
selecting one of the logical blocks of the garbage collection targets based on comparing the respective comparison values of the logical blocks of the garbage collection target candidates with each other;
adding the number of valid data for each bank in each of the logical blocks to the number of valid data for each bank of one of the logical blocks of the garbage collection targets; and
determining a maximum value among the added numbers of valid data for the banks of each of the logical blocks as the comparison value;
wherein as the result of comparing the respective comparison values of the logical blocks of the garbage collection target candidates with each other, when there are a plurality of logical blocks of the garbage collection target candidates having a minimum comparison value, the controller selects, as the logical block of the garbage collection target, the logical block of one garbage collection target candidate among the logical blocks of the garbage collection target candidates having the minimum comparison value, and selects the logical blocks of other garbage collection target candidates as the logical block of the garbage collection target from the next time.

7. The method according to claim 6, further comprising:
calculating an average number of valid data per bank in each of the logical blocks; and
selecting the garbage collection target candidates based on the average numbers of valid data of the logical blocks.

8. The method according to claim 6, wherein the memory is a non-volatile memory.

9. A memory controller configured to:
select logical blocks of garbage collection target candidates based on respective numbers of valid data in a plurality of logical blocks, wherein a memory, coupled to the memory controller, stores the number of valid data in each of the logical blocks and a number of valid data for each of a plurality of banks in each of the logical blocks;
calculate a maximum value among the numbers of valid data for the banks in each of the logical blocks of the garbage collection target candidates as a respective comparison value;
select one of the logical blocks of the garbage collection targets based on comparing the respective comparison values of the logical blocks of the garbage collection target candidates with each other;
add the number of valid data for each bank in each of the logical blocks to the number of valid data for each bank of one of the logical blocks of the garbage collection targets; and
determine a maximum value among the added numbers of valid data for the banks of each of the logical blocks as the comparison value;
wherein as the result of comparing the respective comparison values of the logical blocks of the garbage collection target candidates with each other, when there are a plurality of logical blocks of the garbage collection target candidates having a minimum comparison value, the controller selects, as the logical block of the garbage collection target, the logical block of one garbage collection target candidate among the logical blocks of the garbage collection target candidates having the minimum comparison value, and selects the logical blocks of other garbage collection target candidates as the logical block of the garbage collection target from the next time.

10. The memory controller according to claim 9, wherein the memory controller is further configured to:
calculate an average number of valid data per bank in each of the logical blocks; and
select the garbage collection target candidates based on the average numbers of valid data of the logical blocks.

11. The memory controller according to claim 9, wherein the memory is a non-volatile memory.

* * * * *